UNITED STATES PATENT OFFICE.

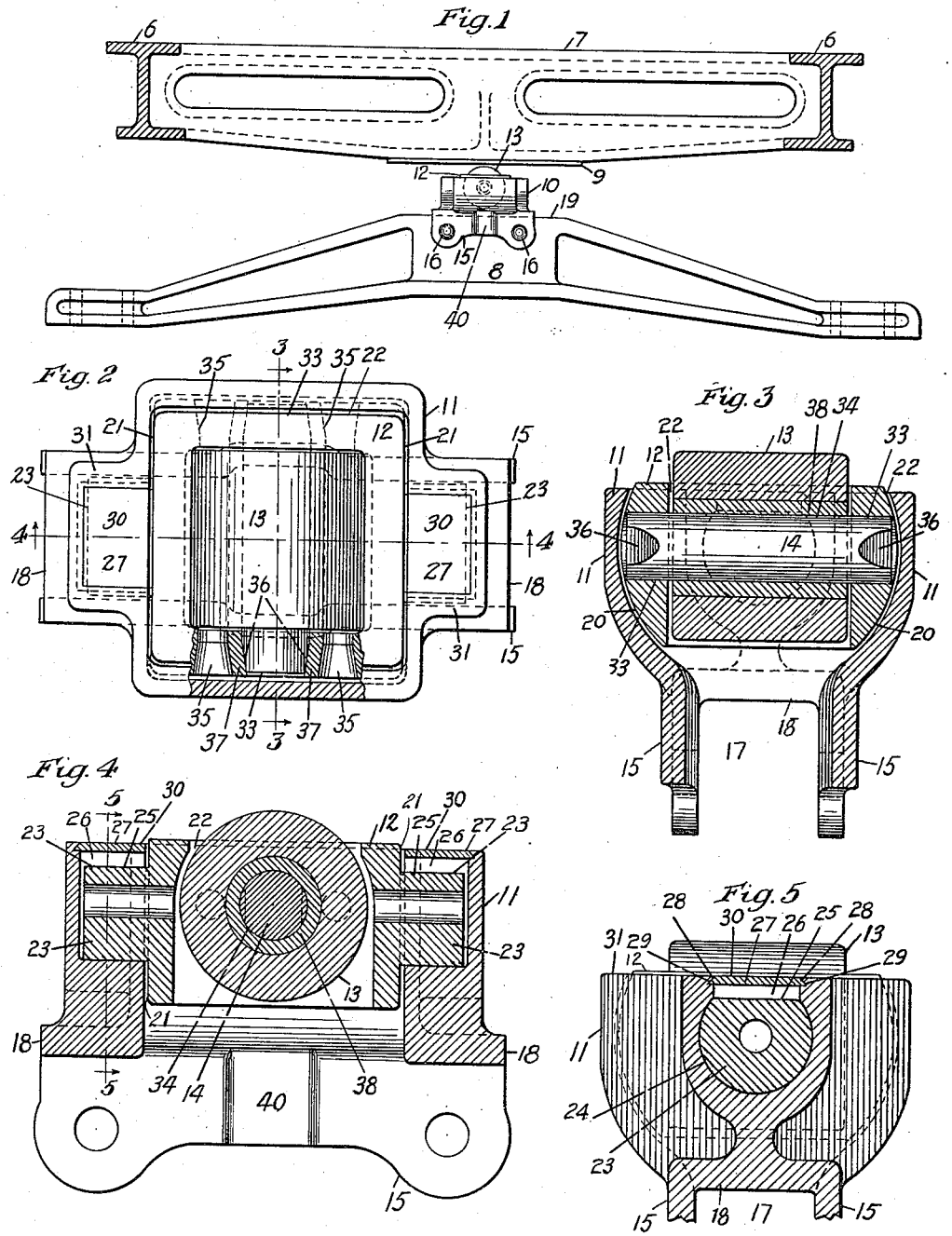

JOHN F. O'CONNOR, OF CHICAGO, ILLINOIS, ASSIGNOR TO WILLIAM H. MINER, OF CHICAGO, ILLINOIS.

SIDE BEARING FOR RAILWAY-CARS.

1,153,699. Specification of Letters Patent. Patented Sept. 14, 1915.

Application filed March 17, 1914. Serial No. 825,219.

*To all whom it may concern:*

Be it known that I, JOHN F. O'CONNOR, a citizen of the United States, residing at Chicago, in the county of Cook and State of Illinois, have invented a certain new and useful Improvement in Side Bearings for Railway-Cars, of which the following is a full, clear, concise, and exact description, reference being had to the accompanying drawings, forming a part of this specification.

My invention relates to improvements in side bearings for railway cars.

The object of my invention is, to provide a side bearing of durable construction and efficient operation.

In the drawings forming a part of this specification, Figure 1 is an end view of a body-bolster and truck-bolster with the side bearings embodying my invention applied thereto. Fig. 2 is a plan view of one of the bearings partly broken away. Fig. 3 is a cross-section taken on line 3—3 of Fig. 2. Fig. 4 is a longitudinal section taken on line 4—4 of Fig. 2. Fig. 5 is a cross-section taken on line 5—5 of Fig. 4.

Referring to the drawings, the numerals 6—6 indicate body-bolsters, joined by the bearing bar 7. The truck-bolster bearing bridge is indicated by the numeral 8. Upon one of the said bridges, preferably the body side bearing bridge 7, is mounted a bearing plate 9. The side bearing 10 comprises a base member 11, a cradle 12, a roller 13, and an axle 14. The base member 11 is preferably in general shape a hollow cylinder open above its longitudinal axis. At its base it is provided with spaced-apart downwardly extended flanges 15—15 adapted to engage the sides of the side bearing bridge to which it is attached. The means of attachment consisting preferably of rivets 16—16 which pass through the bridge and through the flanges 15—15. At either end of the recess 17 formed between the flanges 15, the base casting is preferably provided with outwardly extended shoulders 18, each of the shoulders being adapted to rest upon the upper face 19 of the side bearing bridge to which the bearing is applied. The cradle 12 is of a general rectangular shape in horizontal section, its lateral edges 20—20 being shaped to conform to the curvature of the internal adjacent faces of the base member, the ends 21—21 of the cradle being preferably straight. The cradle 12 is provided with a substantially central vertical opening 22 adapted to receive the roller 13. At either end the cradle 12 is provided with a trunnion 23, each to be mounted within a recess 24—24, there being one at either end of the base member within which a trunnion 23 is journaled. Each trunnion 23 is flattened at its upper edge 25, the recess in which it is received being substantially circular in cross-section in its lower portion, and having an upwardly extending opening 26 of smaller dimension than the greatest diameter of the trunnion, to permit the insertion of the trunnion in the recesses therefor when the cradle is sufficiently rotated within the base member, and to prevent the removal of the cradle from the base member when the parts are in normal assembled position on a car. In order to further secure the cradle trunnions in their bearings, and to prevent the accidental displacement thereof, the top of each recess 24 is preferably closed by a slug or bar 27, the slug or bar 27 having angular ends 28—28 adapted to be received within the oppositely arranged slots 29—29 transversely extended in the walls forming the upper portion 26 of the recess 24. On mounting the cradle in the base member, the slug 27, which is preferably of metal, and somewhat curved before its placing in position, is mounted in the recess 26 and driven flat, so that the ends thereof extend into the appropriate slots just described. The upper face 30 of the slug is, when assembled in preferable arrangement, in the same plane as the adjacent upper edges 31 of the base member. At either side, the cradle is provided with perforations 33 within which the ends of the axle 14 are received, the axle passing through the perforation 34 provided in the roller 13, and extending transversely of the side bearing bridge. Adjacent each perforation 33 in the cradle, and preferably on either side thereof, the cradle is provided with apertures 35—35, each adapted to receive an upsetting punch. The ends of the axle 14 are provided with flattened edges 36—36, in order that the portions 37—37 of the cradle intervening between the perforations 35 and the perforation 33 may be upset and brought into engagement against the flat faces 36 at the ends of the axle, to secure the axle against rotation in the perforations 33—33 in the cradle, in order that the roller may revolve upon the axle, and a large bearing surface between the roll and axle be employed. The perforation 34 in the roll receives a bushing 38 extended from end to end of the roll, and which in preferable construction is made integral with the roller 13.

The upper opening of the base member is of lesser width than its greatest diameter between the oppositely curved walls, in order that the cradle when mounted within the base member cannot be accidentally removed, its removal being effected through rotating the cradle until one end of the same is within the upper opening of the base member, whereupon, and upon the removal of the slugs 27, the cradle may be withdrawn. The depending flanges 15—15 of the base member are each provided on their inner faces with a vertical groove 40, which groove and the base member when mounted in position upon the side bearing bridge, form with the adjacent faces of the bridge a vertical opening through which any foreign material that may accidentally come within the base member is discharged.

In assembling the parts of the bearing, the roller 13 is placed in the opening in the cradle 12, the axle 14 inserted through one of the perforations 33 in the cradle, and through the roller 13 until the axle is brought to its proper position within the roll, as illustrated in Fig. 3 of the drawings; thereupon a punch or other suitable tool may be employed to upset the portions 37—37 of the cradle intervening between the perforation 33 and the adjacent perforations 35 at either end of the cradle, the upsetting tool being inserted in the perforations 35 to secure the engagement of adjacent portions of the cradle against the flattened faces near the ends of the axle 14; thereupon one end of the cradle is inserted within the hollow in the base member 11, and rotated therein to a horizontal position. The slugs 27 when employed are then placed in position, and the base casting mounted upon one of the side bearing bridges. When mounted in its position upon the car, the roller 13 is adapted to be engaged by the opposed bearing plate 9. It will be apparent that the ends of the axle 14 are thoroughly inclosed when the parts are in their assembled relation, and that the trunnions 23 of the cradle are so inclosed as to prevent the lodgment of foreign material therein, and that by reason of the extension of the bushing 38 throughout the roller, and the means employed to secure the axle against rotation, that a large bearing surface between the axle and roller is secured, which with the other features described insures extremely slow wear and a long life for the bearing.

I claim:

1. A side bearing for railway cars, comprising a base casting, a cradle rockably mounted within said casting, an anti-friction roller mounted in said cradle, and a shaft on which said roller is mounted, said shaft having flattened ends inserted in recesses in the cradle, and the cradle having recesses adjacent the recesses which receive the shaft ends which permit a tool to be inserted therein to upset the adjacent metal and force it against the flattened ends of said shaft to prevent rotation of the latter.

2. A side bearing for railway cars comprising a base casting having depending side flanges adapted to be secured to a side bearing bridge of a truck, said base casting having a hollowed out portion above said flanges, a cradle rockably mounted within said hollowed out portion, said cradle being horizontally arranged in normal position, the hollowed out portion of the base casting being arranged to permit the cradle to be moved to vertical position therein, trunnions extending laterally from said cradle and mounted in bearings provided in the base casting, said trunnions being flattened at one portion and the bearings in the base casting having a restricted opening arranged to permit the insertion and removal of said trunnions when the cradle is in a vertical position.

3. A side bearing for railway cars comprising a base casting having side flanges adapted to be secured to a side bearing bridge of a truck, said base casting having a hollowed out portion above said flanges, a cradle rockably mounted within said hollowed out portion, said cradle being horizontally arranged in normal position, the hollowed out portion of the base casting being arranged to permit the cradle to be moved to vertical position therein, trunnions extending laterally from said cradle and mounted in bearings provided in the base casting, said trunnions being flattened at one portion and the bearings in the base casting having a restricted opening arranged to permit the insertion and removal of said trunnions when the cradle is in a vertical position and removable closure plates for said restricted openings.

4. A roller bearing comprising, in combination: a single piece base casting having a hollowed out portion and provided with bearings in two opposite walls thereof, each of said bearings having a restricted opening; and a roller-carrying cradle rockably mounted within said casting and arranged horizontally when in normal, operative position, said cradle being provided with laterally extending trunnions, the trunnions being insertible into said bearings through the restricted openings thereof when the cradle is in a vertical position, said bearings retaining the trunnions of said cradle when the latter is in horizontal position, the hollowed out portion of said base casting permitting the cradle to be turned to a vertical position while therein, said cradle being insertible within and removable from said casting while the latter is secured in position on a truck.

JOHN F. O'CONNOR.

Witnesses:
GEORGE A. JOHNSON,
WILLIAM A. GEIGER.

Copies of this patent may be obtained for five cents each, by addressing the "Commissioner of Patents, Washington, D. C."